US005800594A

United States Patent [19]

Sievers et al.

[11] Patent Number: 5,800,594
[45] Date of Patent: Sep. 1, 1998

[54] COLUMN AND PROCESSES FOR PURIFYING SOLVENT-CONTAINING GASES

[75] Inventors: Werner Sievers, Frankfurt; Günter Müller, Wiesbaden, both of Germany

[73] Assignee: Hoechst Aktiengesellschaft, Frankfurt, Germany

[21] Appl. No.: 797,184

[22] Filed: Feb. 10, 1997

[30] Foreign Application Priority Data

Feb. 12, 1996 [DE] Germany ............... 196 04 986.5

[51] Int. Cl.⁶ ................................................ B01D 47/14
[52] U.S. Cl. ................................ 95/211; 96/291; 261/94
[58] Field of Search .................. 95/211, 212; 55/233; 261/94–98, DIG. 72

[56] References Cited

U.S. PATENT DOCUMENTS

| 2,212,932 | 8/1940 | Fairlie | 261/94 |
|---|---|---|---|
| 2,253,261 | 8/1941 | Bacon | 261/94 |
| 3,122,594 | 2/1964 | Kielback | 261/94 |
| 3,350,075 | 10/1967 | Douglas | 261/DIG. 72 |
| 3,364,656 | 1/1968 | Whiton et al. | 261/94 X |
| 3,410,057 | 11/1968 | Lerner | 261/94 X |
| 3,438,614 | 4/1969 | Lipinski | 261/98 |
| 3,768,234 | 10/1973 | Hardison | 55/233 X |
| 3,911,066 | 10/1975 | Ireland, Jr. et al. | 261/94 |
| 5,376,165 | 12/1994 | Ruff et al. | 95/212 |
| 5,588,986 | 12/1996 | Davis et al. | 95/211 |

FOREIGN PATENT DOCUMENTS

| 0610751 | 8/1984 | European Pat. Off. . |
| 25 18 878 | 11/1975 | Germany . |
| WO 91 08048 | 6/1991 | WIPO . |

OTHER PUBLICATIONS

Klaus Sattler: "Thermische Trennverfahren" 1995, VCH Verlagsgesellschaft Mbh, D–69451 Weinheim XP002029493, pp.97–104.

Primary Examiner—Richard L. Chiesa
Attorney, Agent, or Firm—Frommer Lawrence & Haug LLP

[57] ABSTRACT

The invention relates to a fluidized-bed scrubber containing fluidizing bodies for purifying gases and to processes for its operation. The invention enables the fluidized-bed scrubber to be dimensioned, and the processes to be carried out, in such a manner that the number of fluidizing bodies is minimized and as much energy as possible is saved, without this decreasing the purifying efficiency.

21 Claims, No Drawings

COLUMN AND PROCESSES FOR PURIFYING SOLVENT-CONTAINING GASES

RELATED APPLICATION

This application claims priority to German Application No. P19604986.5, filed Feb. 12, 1996, incorporated herein by reference.

BACKGROUND OF THE INVENTION

1. Field of the Invention

The invention relates to a column for treating gases, in particular for removing or recovering gaseous minor components from the gases or for introducing gaseous minor components into the gases, the column having a first entrance and a first exit for the gas and a second entrance and a second exit for a scrubbing liquid and containing at least one packed bed of fluidizing bodies, and the gas being able to be conducted at an adjustable velocity in the column from bottom to top and the liquid being able to be conducted in countercurrent to the gas.

The invention further relates to a process for treating gases, in particular for removing or recovering gaseous minor components from the gases or for introducing gaseous minor components into the gases, in which the gas is passed at an adjustable velocity from bottom to top through a column containing fluidizing bodies and a liquid is conducted in countercurrent thereto, at least one fluidized bed forming and a dynamic liquid holdup establishing itself.

The invention further relates to a process for treating gases, in particular for removing or recovering gaseous minor components from the gases or for introducing gaseous minor components into the gases, in which the gas is passed at an adjustable velocity from bottom to top through a column containing fluidizing bodies, at least one fluidized bed forming, and a liquid is conducted in countercurrent to the gas at an adjustable velocity, an effective gas/liquid phase interface forming.

The invention further relates to a process for treating gases, in particular for removing or recovering gaseous minor components from the gases or for introducing gaseous minor components into the gases, in which the gas is passed at an adjustable velocity from bottom to top through a column containing fluidizing bodies and a liquid is conducted in countercurrent thereto, at least one fluidized bed forming and a dynamic liquid holdup establishing itself.

2. Description of the Related Art

Columns and processes for purifying solvent-containing gases are disclosed, for example in EP-0 456 797 (D1) and DE 3 613 151 (D2), hereby incorporated by reference. Columns of this type are also termed fluidized-bed scrubbers.

D1 discloses a process for treating gases, in particular for removing or recovering minor constituents in the form of particles, gaseous substances and/or droplets, for heat exchange between gases and liquids and/or for moistening gases, in a fluidized-bed scrubber containing ellipsoidal packings which are fluidized by the gas to be treated and are impinged in countercurrent with a scrubbing liquid. This process is distinguished by the pressure gradient in the fluidized bed being greater than 1500 Pa/m, based on the packing height in the idle state, and by the ellipsoidal packings in the fluidized state being activated to give a tumbling motion circulating over the entire region of the fluidized-bed scrubber. In addition, fluidized-bed scrubbers having one or more fluidized beds are indicated. A disadvantage of such scrubbers or processes is that a great number of packings are required which are furthermore relatively expensive.

SUMMARY OF THE INVENTION

The invention relates to a column for treating gases, in particular for removing or recovering gaseous minor components from the gases and for introducing gaseous minor components into the gases. The column has a first entrance and a first exit for the gas and a second entrance and a second exit for a scrubbing liquid and contains at least one packed bed of fluidizing bodies. The gas is conducted at an adjustable velocity in the column from bottom to top and the liquid is conducted countercurrent to the gas. The column height is dimensioned according to the formula:

$$H = k_1 \cdot SZ \cdot SH \tag{1}$$

$$sz = \frac{y_e - y_a}{(y_e - y^*_e) - (y_a - y^*_a)} \cdot \ln \frac{y_e - y^*_e}{y_a - y^*_a} \tag{2}$$

$$SH = k_2 \cdot d \cdot F^{k_3} \cdot S^{k_4} \; y^*_a = m \cdot x_a, \; y^*_e = m \cdot x_e, \tag{3}$$

This invention also relates to a process for treating gases, in particular for removing or recovering gaseous minor components from the gases or for introducing gaseous minor components into the gases, in which the gas is passed at an adjustable velocity from bottom to top through a column containing fluidizing bodies and the liquid is conducted countercurrent thereto, at least one fluidized bed forming and a dynamic liquid holdup establishing itself. In one embodiment of this invention, the dynamic liquid holdup if the column is established according to the formula:

$$h = k_5 \cdot \exp\left[ k_6 \cdot u_G^{k_7} \cdot \left[ \frac{\rho_G^{k_8}}{\eta_G \cdot (\rho_L - \rho_G) \cdot g} \right]^{k_9} \right] \cdot F^{k_{10}} \tag{4}$$

In another embodiment of this invention, the ratio of effective phase interfacial area to surface area of all the fluidizing bodies is established according to the formula:

$$\frac{a}{O} = \left[ k_{12} \cdot \frac{u_G \cdot d}{v_G} + K_{13} \right] \cdot [O \cdot d]^{k_{14}} \cdot \left[ \frac{u_L^{k_7} \cdot \rho_L \cdot d}{\sigma_L} \right]^{k_{15}} \left[ \frac{u_L^{k_7}}{g \cdot d} \right]^{k_{16}} \tag{5}$$

In yet another embodiment of this invention, the pressure drop over the fluidized bed is established according to the formula:

$$\frac{\Delta P}{H_O} = (k_{22} - \epsilon_O) \cdot (\rho_s - \rho_G) \cdot g \cdot k_{17} \cdot (k_{18} - k_{19} \cdot h^{k_{20}})^{k_{21}} \tag{6}$$

OBJECTS OF THE INVENTION

The object underlying the invention was to optimize column and processes in such a manner that the fewest possible packings are required, without the purification efficiency of the column or the processes being impaired as a result. According to the invention, this object is achieved by a column of the type mentioned at the outset in which the column height is dimensioned according to the formulae below:

$$H = k_1 \cdot SZ \cdot SH \tag{1}$$

$$sz = \frac{y_e - y_a}{(y_e - y^*_e) - (y_a - y^*_a)} \cdot \ln \frac{y_e - y^*_e}{y_a - y^*_a} \quad (2)$$

$$SH = k_2 \cdot d \cdot F^{k_3} \cdot S^{k_4} y^*_a = m \cdot x_a, \quad y^*_e = m \cdot x_e, \quad (3)$$

in which the constants and variables have the following meanings:

H is the column height,
SZ is the number of theoretical plates of the column,
SH is the height equivalent to theoretical plate,
F is the Froude number, $$F = u^2_L/(g \cdot d),$$

S is the Schmidt number, $$S = v_G/D,$$

d is the characteristic dimension of the fluidizing bodies,
$u_L$ is the liquid velocity,
g is acceleration due to gravity,
D is the diffusion coefficient of the gaseous minor component in the gas,
$v_G$ is the kinematic viscosity of the gas,
$y_e$ is the mole fraction of the gaseous minor component in the gas at the gas entrance,
$y_a$ is the mole fraction of the gaseous minor component in the gas at the gas exit,
$y^*_e$ is the equilibrium mole fraction of the gaseous minor component in the liquid at the gas entrance temperature,
$y^*_a$ is the equilibrium mole fraction of the gaseous minor component in the liquid at the gas exit temperature,
m is the phase equilibrium constant,
$x_e$ is the mole fraction of the gaseous minor component in the liquid at the liquid entrance,
$x_a$ is the mole fraction of the gaseous minor component in the liquid at the liquid exit,
$k_1$ is a constant from the range 1.5 to 2.5,
$k_2$ is a constant from the range 1.5 to 2.5,
$k_3$ is a constant from the range −1 to 0,
$k_4$ is a constant from the range 0 to 1.

The object is further achieved according to the invention by processes of the type mentioned at the outset, which comprise the dynamic liquid holdup of the column being established according to the formula below:

$$h = k_5 \cdot \exp\left[ k_6 \cdot u_G^{k_7} \cdot \left[ \frac{\rho_G^{k_8}}{\eta_G \cdot (\rho_L - \rho_G) \cdot g} \right]^{k_9} \right] \cdot F^{k_{10}} \quad (4)$$

where the constants and variables have the following meanings:

h is the dynamic liquid holdup,
$u_G$ is the gas velocity,
$\rho_G$ is the gas density,
$\eta_G$ is the dynamic viscosity of the gas,
$\rho_L$ is the scrubbing liquid density,
F is the Froude number, $$F = u^2_L/g \cdot d,$$

$u_L$ is the scrubbing liquid velocity, g is acceleration due to gravity,
d is the characteristic dimension of the fluidizing bodies,
$k_5$ is a constant from the range 4.0 to 4.5,
$k_6$ is a constant from the range 0.005 to 0.015,
$k_7$ is a constant from the range 1.5 to 2.5,
$k_8$ is a constant from the range 1.5 to 2.5,
$k_9$ is a constant from the range 0.5 to 1.0,
$k_{10}$ is a constant from the range 0 to 0.6, or the ratio of effective phase interfacial area to surface area of all the fluidizing bodies being established according to the formula below:

$$\frac{a}{O} = \left[ k_{12} \cdot \frac{u_G \cdot d}{v_G} + K_{13} \right] \cdot [O \cdot d]^{k_{14}} \cdot \left[ \frac{u_L^{k_7} \cdot \rho_L \cdot d}{\sigma_L} \right]^{k_{15}} \left[ \frac{u_L^{k_7}}{g \cdot d} \right]^{k_{16}} \quad (5)$$

where the constants and variables are as defined above or have the meanings below:

a is the effective gas/liquid phase interfacial area,
O is the surface area of the fluidizing bodies,
$u_L$ is the liquid velocity,
$\sigma_L$ is the surface tension of the liquid,
$k_{12}$ is a constant from the range $2.5 \cdot 10^{-4}$ to $3.5 \cdot 10^{-4}$,
$k_{13}$ is a constant from the range 0.3 to 0.5,
$k_{14}$ is a constant from the range −0.4 to −0.6,
$k_{15}$ is a constant from the range 0.4 to 0.8,
$k_{16}$ is a constant from the range −0.6 to −0.2, or the pressure drop over the fluidized bed being established according to the formula below:

$$\frac{\Delta P}{H_o} = (k_{22} - \epsilon_o) \cdot (\rho_s - \rho_G) \cdot g \cdot k_{17} \cdot (k_{18} - k_{19} \cdot H^{k_{20}})^{k_{21}} \quad (6)$$

where the variables or constants are as defined above or have the meanings below:

ΔP is the pressure drop over a fluidized bed,
$H_o$ is the height of a bed of fluidizing bodies at rest,
$\epsilon_o$ is the void fraction of the bed at rest,
$\rho_s$ is the apparent density of a fluidizing body,
$k_{17}$ is a constant from the range 0.7 to 1.1,
$k_{18}$ is a constant from the range 0.8 to 1.2,
$k_{19}$ is a constant from the range 0.1 to 0.5,
$k_{20}$ is a constant from the range 0.4 to 0.8,
$k_{21}$ is a constant from the range −7 to −3,
$k_{22}$ is a constant from the range 0.8 to 1.2.

The foregoing and other objects and advantages of the invention will be set forth in or apparent from the following description.

DESCRIPTION OF THE PREFERRED EMBODIMENTS

The invention thus relates to a column for treating gases, in particular for removing or recovering gaseous minor components from the gases or for introducing gaseous minor components into the gases, the column having a first entrance and a first exit for the gas and a second entrance and a second exit for a scrubbing liquid and containing at least one packed bed of fluidizing bodies, and the gas being able to be conducted at an adjustable velocity in the column from bottom to top and the liquid being able to be conducted in countercurrent to the gas, which comprises the column height being dimensioned according to the formulae below:

$$H = k_1 \cdot SZ \cdot SH \tag{1}$$

$$SZ = \frac{y_e - y_a}{(y_e - y^*_e) - (y_a - y^*_a)} \cdot \ln \frac{y_e - y^*_e}{y_a - y^*_a} \tag{2}$$

$$SH = k_2 \cdot d \cdot F^{k_3} \cdot S^{k_4} \tag{3}$$

$$y^*_a = m \cdot x_a, \; y^*_e = m \cdot x_e,$$

in which the constants and variables have the following meanings:

H is the column height,
SZ is the number of theoretical plates of the column,
SH is the height equivalent to theoretical plate,
F is the Froude number, $$F = u^2_L/(g \cdot d),$$

S is the Schmidt number, $$S = v_G/D,$$

d is the characteristic dimension of the fluidizing bodies,
$u_L$ is the liquid velocity,
g is acceleration due to gravity,
D is the diffusion coefficient of the gaseous minor component in the gas,
$v_G$ is the kinematic viscosity of the gas,
$y_e$ is the mole fraction of the gaseous minor component in the gas at the gas entrance,
$y_a$ is the mole fraction of the gaseous minor component in the gas at the gas exit,
$y^*_e$ is the equilibrium mole fraction of the gaseous minor component in the liquid at the gas entrance temperature,
$y^*_a$ is the equilibrium mole fraction of the gaseous minor component in the liquid at the gas exit temperature,
m is the phase equilibrium constant,
$x_e$ is the mole fraction of the gaseous minor component in the liquid at the liquid entrance,
$x_a$ is the mole fraction of the gaseous minor component in the liquid at the liquid exit,
$k_1$ is a constant from the range 1.5 to 2.5,
$k_2$ is a constant from the range 1.5 to 2.5,
$k_3$ is a constant from the range −1 to 0,
$k_4$ is a constant from the range 0 to 1.

The height equivalent to theoretical plate corresponds here to the distance between two theoretical column plates.

The number of plates actually installed in the real column (practical plates) is generally in the range SZ to 2·SZ, inclusive, depending on the requirements of the specific individual case. The distance between two practical plates is then accordingly less. The space thus defined between two practical column plates is advantageously filled with fluidizing bodies at most up to about half the distance, in order to offer sufficient space for the fluidizing.

The invention further relates to a process for treating gases, in particular for removing or recovering gaseous minor components from the gases or for introducing gaseous minor components into the gases, in which the gas is passed at an adjustable velocity from bottom to top through a column containing fluidizing bodies and a liquid is conducted in countercurrent thereto, at least one fluidized bed forming and a dynamic liquid holdup establishing itself, which comprises the dynamic liquid holdup of the column being established according to the formula below:

$$h = k_5 \cdot \exp\left[ k_6 \cdot u_G^{k_7} \cdot \left[ \frac{\rho_G^{k_8}}{\eta_G \cdot (\rho_L - \rho_G) \cdot g} \right]^{k_9} \right] \cdot F^{k_{10}} \tag{4}$$

where the constants and variables have the following meanings:

h is the dynamic liquid holdup,
$u_G$ is the gas velocity,
$\rho_G$ is the gas density,
$\eta_G$ is the dynamic viscosity of the gas,
$\rho_L$ is the scrubbing liquid density,
F is the Froude number, $$F = u^2_L/g \cdot d,$$

$u_L$ is the scrubbing liquid velocity,
g is acceleration due to gravity,
d is the characteristic dimension of the fluidizing bodies,
$k_5$ is a constant from the range 4.0 to 4.5,
$k_6$ is a constant from the range 0.005 to 0.015,
$k_7$ is a constant from the range 1.5 to 2.5,
$k_8$ is a constant from the range 1.5 to 2.5,
$k_9$ is a constant from the range 0.5 to 1.0,
$k_{10}$ is a constant from the range 0 to 0.6.

The invention further relates to a process for treating gases, in particular for removing or recovering gaseous minor components from the gases or for introducing gaseous minor components into the gases, in which the gas is passed at an adjustable velocity from bottom to top through a column containing fluidizing bodies, at least one fluidized bed forming, and a liquid being conducted in countercurrent to the gas at an adjustable velocity, an effective gas/liquid phase interface forming, which comprises the ratio of effective phase interfacial area to surface area of all the fluidizing bodies being established according to the formula below:

$$\frac{a}{O} = \left[ k_{12} \cdot \frac{u_G \cdot d}{v_G} + K_{13} \right] \cdot [O \cdot d]^{k_{14}} \cdot \left[ \frac{k_7}{u_L \cdot \rho_L \cdot d} \right]^{k_{15}} \left[ \frac{k_7}{u_L \cdot g \cdot d} \right]^{k_{16}} \tag{5}$$

where the constants and variables are as defined above or have the meanings below:

a is the effective gas/liquid phase interfacial area,
O is the surface area of the fluidizing bodies,
$u_L$ is the liquid velocity,
$\sigma_L$ is the surface tension of the liquid,
$K_{12}$ is a constant from the range $2.5 \cdot 10^{-4}$ to $3.5 \cdot 10^{-4}$,
$k_{13}$ is a constant from the range 0.3 to 0.5,
$k_{14}$ is a constant from the range −0.4 to −0.6,
$k_{15}$ is a constant from the range 0.4 to 0.8,
$k_{16}$ is a constant from the range −0.6 to −0.2.

The invention further relates to a process for treating gases, in particular for removing or recovering gaseous minor components from the gases or for introducing gaseous minor components into the gases, in which the gas is passed at an adjustable velocity from bottom to top through a column containing fluidizing bodies and a liquid is conducted in countercurrent thereto, at least one fluidized bed forming and a dynamic liquid holdup establishing itself, which comprises establishing the pressure drop over the fluidized bed according to the formula below:

$$\frac{\Delta P}{H_O} = (k_{22} - \epsilon_0) \cdot (\rho_s - \rho_G) \cdot g \cdot k_{17} \cdot \left(k_{18} - k_{19} \cdot h^{k_{20}}\right)^{k_{21}} \quad (6)$$

where the variables or constants are as defined above or have the meanings below:

$\Delta P$ is the pressure drop over a fluidized bed,
$H_o$ is the height of a bed of fluidizing bodies at rest,
$\epsilon_o$ is the void fraction of the bed at rest,
$\rho_S$ is the apparent density of a fluidizing body,
$k_{17}$ is a constant from the range 0.7 to 1.1,
$k_{18}$ is a constant from the range 0.8 to 1.2,
$k_{19}$ is a constant from the range 0.1 to 0.5,
$k_{20}$ is a constant from the range 0.4 to 0.8,
$k_{21}$ is a constant from the range −7 to −3,
$k_{22}$ is a constant from the range 0.8 to 1.2.

"Dynamic liquid holdup" is taken to mean here all of the liquid holdup of the column present in the form of droplets, jets or layers. It is based on the volume of the layers of the fluidizing bodies at rest. The effective phase interfacial area a includes all of the areas active for mass transfer, such as the wetted surface of the fluidizing bodies and droplet and trickling film surfaces.

The characteristic dimension of the fluidizing bodies to be used is, in the case of spheres, their diameter, in the case of ellipsoids or other fluidizing bodies the so-called Sauter diameter $d_s$, which is defined as $$d_s = \frac{6 \cdot \text{Volume of the fluidizing body}}{\text{Surface area of the fluidizing body}}$$

The characteristic dimension according to D1 (EP-0 456 797) and D2 (DE 3 613 151) is usually in the range 10 to 100 mm.

The apparent density $\rho_s$ of the fluidizing bodies is defined as $$\rho_S = \frac{\text{Weight of the fluidizing body}}{\text{Volume of the fluidizing body}}$$

Advantageous variants of the invention are that the constants $k_1$ to $k_{22}$ have values from the following ranges:

$k_1$: 1.9 to 2.1; $k_2$: 1.9 to 2.0; $k_3$: −0.2 to −0.1; $k_4$: 0.5 to 0.6; $k_5$: 4.2 to 4.3; $k_6$: 0.009 to 0.011; $k_7$: 1.9 to 2.1; $k_8$: 1.9 to 2.1; $k_9$: 0.6 to 0.7; $k_{10}$: 0.35 to 0.45; $k_{12}$: 2.9·10⁻⁴; to 3.0·10⁻⁴; $k_{13}$: 0.4 to 0.5; $k_{14}$: −0.55 to −0.45; $k_{15}$: 0.62 to 0.68; $k_{16}$: −0.45 to −0.35; $k_{17}$: 0.85 to 0.95; $k_{18}$: 0.95 to 1.05; $k_{19}$: 0.32 to 0.38; $k_{20}$: 0.55 to 0.65; $k_{21}$: −5.5 to −4.5; $k_{22}$: 0.95 to 1.05.

Particularly advantageous variants of the invention are that the constants $k_1$ to $k_{22}$ have the following values:

$k_1$: 2; $k_2$: 1.937; $k_3$: −0.157; $k_4$: 0.533; $k_5$: 4.28; $k_6$: 0.01; $k_7$: 2; $k_8$: 2; $kg$: ⅔; $k_{10}$: 0.4; $k_{12}$: 2.96·10⁻⁴; $k_{13}$: 0.44; $k_{14}$: −0.5; $k_{15}$: 0.65; $K_{16}$: −0.4; $k_{17}$: 0.9; $k_{18}$: 1; $k_{19}$: 0.35; $k_{20}$: 0.6; $k_{21}$: −5; $k_{22}$: 1.

In a further particularly advantageous embodiment of the invention, the processes according to the invention are carried out in a column according to the invention.

Column and processes are particularly suitable for purifying exhaust air which contains industrial gases such as $NH_3$, $SO_2$, HF, $NO_x$, CO, $H_2S$ or gaseous minor components or solvents such as alcohols, ethers, aromatics or acids.

There is no restriction with respect to the gases or gaseous substances.

The column can be prepared according to the customary methods familiar to those skilled in the art.

The material properties can be taken from tabulated values or data bases known to those skilled in the art or can be calculated from known material properties.

The advantages of the invention are essentially that, at a given purification efficiency, the number of packings is minimized and that money and energy can be saved by this means. This is made clear below with reference to two examples.

The above description of the invention is intended to be illustrative and not limiting. Various changes or modifications in the embodiments described may occur to those skilled in the art. These can be made without departing from the spirit or scope of the invention.

EXAMPLES

This invention is further described and illustrated in the following examples. These examples are not to be considered in any way to limit the invention. numerous changes and modifications can be made with respect to the invention.

Example 1

Purifying acetone-laden exhaust air with water

An exhaust air stream (5726 m³/h), which had been loaded with acetone (25.3 kg/h) was purified to 150 mg/m³. Acetone is a substance of hazard class III, of which a maximum of 150 mg/m³ is permissible in the cleaned exhaust air according to the German "TA-Luft" [Clean air regulations].

The scrubbing liquid used was water (25.2 m³/h) at ambient temperature (20° C.).

The fluidizing bodies used were rotationally symmetrical ellipsoids of polypropylene, which had an axial ratio of 36 mm to 48 mm.

The purification was carried out in a column having a diameter of 0.9 m. The velocities of gas and liquids with this column were $u_G$=2.5 m/s and $u_L$=0.011 m/s.

Calculation of the height SH equivalent to theoretical plate

The characteristic diameter d=0.043 m of a fluidizing body was used to calculate the Froude number $F=u_L^2/(g \cdot d)$ =0.000287. The Schmidt number was calculated as 1.479 from the kinematic air viscosity (158.2·10⁻⁷ m²/s) and the diffusion coefficient of acetone in air (10.7·10⁻⁶ m²/s). The height SH equivalent to theoretical plate given by formula (3) was SH=0.37 m. The constants $k_1$ to $k_4$ in this case were $k_1$:2, $k_2$: 1.937, $k_3$: −0.157, $k_4$: 0.533. Calculation of the number of theoretical plates:

The mole fractions for the gas were: $y_e$=0.001892 kmol/kmol (equivalent to the acetone mass flow rate of 25.3 kg/h in an air stream of 5726 m³/h), $y_a$=0.000064 kmol/kmol (equivalent to 150 mg/m³). The mole fractions for the liquid were: $x_e$=0 (the water was acetone-free), $x_a$=0.00030 kmol/kmol (calculated from the total mass balance for the column). The Henry constant for acetone/water is, at 20° C., He=1.629 bar, which, at 1 bar overall pressure, gives the phase equilibrium constant m as 1.629. The equilibrium mole fractions are: $y_e^*=x_a \cdot m$=0.000489, $y_a^*=x_e \cdot m$=0.

The number SZ of theoretical plates of the column given by formula (2) was SZ=4.2.

The total height H of the column given by formula (1) was H=2 SZ SH=3.1 m. 8 practical plates are selected, having a spacing between plates of 0.4 m, each packed 20 cm high with fluidizing bodies. The distances between the plates were only half-filled with fluidizing bodies, in order to permit sufficient space for the fluidized bed to develop.

The dynamic liquid holdup h was calculated from formula (4) as h=0.29=29%. For this purpose, in addition to the figures already given above, the dynamic air viscosity (18.48·10⁻⁶ Pas), the air density (1.168 kg/m³) and the density of water (1000 kg/m³) were used. The constants $k_5$ to $k_{10}$ were: $k_5$: 4.28, $k_6$: 0.01, $k_7$: 2, $k_8$: 2, $k_9$: ⅔, $k_{10}$: 0.4.

The specific pressure drop was calculated from the void fraction of the resting layer (0.41), the apparent density of a fluidizing body (175 kg/m³) and the values calculated above to give $\Delta p/H_o$=1886 Pa/m with formula (6). The constants $k_{17}$ to $k_{22}$ were: $k_{17}$: 0.9, $k_{18}$: 1, $k_{19}$: 0.35, $k_{20}$: 0.6, $k_{21}$: −5, $K_{22}$: 1.

Result: The purification task was achieved by the process described with a relatively low usage of fluidizing bodies, as measurements on an operating column showed.

In the process described in D1(EP - 0 456 797), the ratio of liquid to gas is established according to the formula $\Delta p/H_o v$=4.77+1.8·(L/G) ($\Delta p/H_o$ in Pa/m, v=gas velocity in m/s, must be greater than 2.5 m/s, L/G is the ratio of liquid to gas in liters/m³).

If $\Delta p/H_o$ were to be calculated from this formula, this would give a value of 3170 Pa/m, which is significantly greater than the value of 1886 Pa/m calculated according to the invention, which is due, inter alia, to a greater number of fluidizing bodies and/or a greater column height. The process of the invention therefore leads to a considerable saving in cost.

Example 2
Process for purifying an exhaust air stream enriched with tetrahydrofuran Other than in Example 1, in the case here of tetrahydrofuran, a substance was present which is considerably less water-soluble than acetone. The calculations were carried out in a similar manner to Example 1 and using the same values of the constants $k_1$ to $k_{22}$.

A column of diameter 0.9 m was operated at a specific water loading of 60 m³/m²h (corresponding to $u_L$=0.0167 m/s). At a gas velocity of 2.5 m/s, the height equivalent to theoretical plate according to formula (3) was SH=0.35 m. The diffusion coefficient of tetrahydrofuran in the exhaust air, calculated by methods known to those skilled in the art, was 9·10⁻⁶ m²/s. Polypropylene fluidizing bodies having an axial ratio of 36 mm to 48 mm were used.

The exhaust air stream (5700 m³/h) was polluted with a tetrahydrofuran mass flow rate of 17 kg per hour (equivalent to $y_e$=0.00103 kmol/kmol). Therefore, 5.7 theoretical plates were necessary to achieve a required degree of purity of 100 mg/m³. The phase equilibrium constant tetrahydrofuran/water is, at 1 bar and 20° C., m=4.67.

The resulting total column height was 4 m, 8 practical plates being selected, each having a bed height of 0.25 m and a distance between plates of 0.5 m.

The dynamic liquid holdup was calculated from formula (4) as 0.21=21%, and the specific pressure drop as 2252 Pa/m. Measurements on an operating column confirm this result.

In a similar manner to Example 1, $\Delta p/H_o$ is calculated according to D1 (EP - 0 456 797) as 4190 Pa/m. The process according to the invention leads to considerable savings in cost in this example also.

What is claimed is:

1. A column for removing or recovering gaseous minor components from gases or for introducing gaseous minor components into gases, the column having a first entrance and a first exit for the gas and a second entrance and a second exit for a scrubbing liquid and containing at least one packed bed of fluidizing bodies, and the gas being able to be conducted at an adjustable velocity in the column from bottom to top and the liquid being able to be conducted in countercurrent to the gas, the column height being dimensioned according to the formulae below:

$$H = k_1 \cdot SZ \cdot SH$$

$$SZ = \frac{y_e - y_a}{(y_e - y^*_e) - (y_a - y^*_a)} \cdot \ln \frac{y_e - y^*_e}{y_a - y^*_a}$$

$$SH = k_2 \cdot d \cdot F^{k_3} \cdot S^{k_4} \quad y^*_a = m \cdot x_a, y^*_e = m \cdot x_e,$$

in which the constants and variables have the following meanings:

H is the column height,

SZ is the number of theoretical plates of the column,

SH is the height equivalent to theoretical plate,

F is the Froude number, $$F = u^2_L/(g \cdot d),$$

S is the Schmidt number, $$S = v_G/D,$$

d is the characteristic dimension of the fluidizing bodies, $u_L$ is the liquid velocity, g is acceleration due to gravity, D is the diffusion coefficient of the gaseous minor component in the gas, $v_G$ is the kinematic viscosity of the gas, $y_e$ is the mole fraction of the gaseous minor component in the gas at the gas entrance, $y_a$ is the mole fraction of the gaseous minor component in the gas at the gas exit, $y^*_e$ is the equilibrium mole fraction of the gaseous minor component in the liquid at the gas entrance temperature, $y^*_a$ is the equilibrium mole fraction of the gaseous minor component in the liquid at the gas exit temperature, m is the phase equilibrium constant, $x_e$ is the mole fraction of the gaseous minor component in the liquid at the liquid entrance, $x_a$ is the mole fraction of the gaseous minor component in the liquid at the liquid exit, $k_1$ is a constant from the range 1.5 to 2.5, $k_2$ is a constant from the range 1.5 to 2.5, $k_3$ is a constant from the range −1 to 0, $k_4$ is a constant from the range 0 to 1.

2. The column as claimed in claim 1, wherein the constants $k_1$ to $k_4$ have values from the following ranges: $k_1$ is about 1.9 to 2.1; $k_2$ is about 1.9 to 2.0; $k_3$ is about −0.2 to −0.1; $k_4$ is about 0.5 to 0.6.

3. The column as claimed in claim 1, wherein the constants $k_1$ to $k_4$ have the following values: $k_1$ is about 2; $K_2$ is about 1.937; $K_3$ is about −0.157; $k_4$ is about 0.533.

4. A process for removing or recovering gaseous minor components from gases or for introducing gaseous minor components into gases, in which the gas is passed at an adjustable velocity from bottom to top through a column containing fluidizing bodies and a liquid is conducted in countercurrent thereto, at least one fluidized bed forming and a dynamic liquid holdup establishing itself, which comprises the dynamic liquid holdup of the column being established according to the formula below:

$$h = k_5 \cdot \exp\left[ k_6 \cdot u_G^{k_7} \cdot \left[ \frac{\rho_G^{k_8}}{\eta_G \cdot (\rho_L - \rho_G) \cdot g} \right]^{k_9} \right] \cdot F^{k_{10}}$$

where the constants and variables have the following meanings:

h is the dynamic liquid holdup,
$u_G$ is the gas velocity,
$\rho_G$ is the gas density,
$\eta_G$ is the dynamic viscosity of the gas,
$\rho_L$ is the scrubbing liquid density,
F is the Froude number, $$F = u^2_L / g \cdot d,$$

$u_L$ is the scrubbing liquid velocity,
g is acceleration due to gravity,
d is the characteristic dimension of the fluidizing bodies,
$k_5$ is a constant from the range 4.0 to 4.5,
$k_6$ is a constant from the range 0.005 to 0.015,
$k_7$ is a constant from the range 1.5 to 2.5,
$k_8$ is a constant from the range 1.5 to 2.5,
$k_9$ is a constant from the range 0.5 to 1.0,
$k_{10}$ is a constant from the range 0 to 0.6.

5. The process as claimed in claim 4, wherein the constants $k_5$ to $k_{10}$ have values from the following ranges: $k_5$ is about 4.2 to 4.3; $k_6$ is about 0.009 to 0.011; $k_7$ is about 1.9 to 2.1; $k_8$ is about 1.9 to 2.1; $k_9$ is about 0.6 to 0.7; $k_{10}$ is about 0.35 to 0.45.

6. The process as claimed in claim 4, wherein the constants $k_5$ to $k_{10}$ have the following values: $k_5$ is about 4.28; $k_6$ is about 0.01; $k_7$ is about 2; $k_8$ is about 2; $k_9$ is about ⅔; $k_{10}$ is about 0.4.

7. The process as claimed in claim 4, wherein the process is carried out in a column for removing or recovering gaseous minor components from gases or for introducing gaseous minor components into gases, the column having a first entrance and a first exit for the gas and a second entrance and a second exit for a scrubbing liquid and containing at least one packed bed of fluidizing bodies, and the gas being able to be conducted at an adjustable velocity in the column from bottom to top and the liquid being able to be conducted in countercurrent to the gas, the column height being dimensioned according to the formulae below:

$$H = k_1 \cdot SZ \cdot SH$$

$$SZ = \frac{y_e - y_a}{(y_e - y^*_e) - (y_a - y^*_a)} \cdot \ln \frac{y_e - y^*_e}{y_a - y^*_a}$$

$$SH = k_2 \cdot d \cdot F^{k_3} \cdot S^{k_4}\ y^*_a = m \cdot x_a, y^*_e = m \cdot x_e,$$

in which the constants and variables have the following meanings:

H is the column height,
SZ is the number of theoretical plates of the column,
SH is the height equivalent to theoretical plate,
F is the Froude number, $$F = u^2_L / (g \cdot d),$$

S is the Schmidt number, $$S = v_G / D,$$

d is the characteristic dimension of the fluidizing bodies,
$u_L$ is the liquid velocity,
g is acceleration due to gravity,
D is the diffusion coefficient of the gaseous minor component in the gas,
$v_G$ is the kinematic viscosity of the gas,
$y_e$ is the mole fraction of the gaseous minor component in the gas at the gas entrance,
$y_a$ is the mole fraction of the gaseous minor component in the gas at the gas exit,
$y^*_e$ is the equilibrium mole fraction of the gaseous minor component in the liquid at the gas entrance temperature,
$y^*_a$ is the equilibrium mole fraction of the gaseous minor component in the liquid at the gas exit temperature,
m is the phase equilibrium constant,
$x_e$ is the mole fraction of the gaseous minor component in the liquid at the liquid entrance,
$x_a$ is the mole fraction of the gaseous minor component in the liquid at the liquid exit,
$k_1$ is a constant from the range 1.5 to 2.5,
$k_2$ is a constant from the range 1.5 to 2.5,
$k_3$ is a constant from the range −1 to 0,
$k_4$ is a constant from the range 0 to 1.

8. The process as claimed in claim 7, wherein the constants $k_1$ to $k_4$ have values from the following ranges: $k_1$ is about 1.9 to 2.1; $k_2$ is about 1.9 to 2.0; $k_3$ is about −0.2 to −0.1; $k_4$ is about 0.5 to 0.6.

9. The process as claimed in claim 7, wherein the constants $k_1$ to $k_4$ have the following values: $k_1$ is about 2; $k_2$ is about 1.937; $k_3$ is about −0.157; $k_4$ is about 0.533.

10. A process for removing or recovering gaseous minor components from gases or for introducing gaseous minor components into gases, in which the gas is passed at an adjustable velocity from bottom to top through a column containing fluidizing bodies, at least one fluidized bed forming, and a liquid being conducted in countercurrent to the gas at an adjustable velocity, an effective gas/liquid phase interface forming, which comprises the ratio of effective phase interfacial area to surface area of all fluidizing bodies being established according to the formula below:

$$\frac{a}{O} = \left[ k_{12} \cdot \frac{u_G \cdot d}{v_G} + K_{13} \right] \cdot [O \cdot d]^{k_{14}} \cdot \left[ \frac{u_L \cdot \rho_L \cdot d}{\sigma_L} \right]^{k_{15}} \left[ \frac{u_L}{g \cdot d} \right]^{k_{16}}$$

where the constants and variables are as defined above or have the meanings below:

a is the effective gas/liquid phase interfacial area,
O is the surface area of the fluidizing bodies,
$u_L$ is the liquid velocity,
$\sigma_L$ is the surface tension of the liquid,
$u_G$ is the gas velocity,
d is the characteristic dimension of the fluidizing bodies,
$v_G$ is the kinematic viscosity of the gas,
$\rho_L$ is the scrubbing liquid density, g is acceleration due to gravity.

$k_7$ is a constant from the range 1.5 to 2.5, $k_{12}$ is a constant from range $2.5 \cdot 10^{-4}$ to $3.5 \cdot 10^{-4}$, $k_{13}$ is a constant from the range 0.3 to 0.5, $k_{14}$ is a constant from the range −0.4 to −0.6, $k_{15}$ is a constant from the range 0.4 to 0.8, $k_{16}$ is a constant from the range −0.6 to 0.2.

11. The process as claimed in claim 10, wherein the constants $k_7$, $k_{12}$ to $k_{16}$ have values from the following ranges: $k_7$ is about 1.9 to 2.1; $k_{12}$ is about $2.9 \cdot 10^{-4}$ to $3.0 \cdot 10^{-4}$; $k_{13}$ is about 0.4 to 0.5; $k_{14}$ is about −0.55 to −0.45; $k_{15}$ is about 0.62 to 0.68; $k_{16}$ is about −0.45 to −0.35.

12. The process as claimed in claim 10 wherein the constants $k_7$, $k_{12}$ to $k_{16}$ have the following values: $k_7$ is about 2; $k_{12}$ is about $2.96 \cdot 10^{-4}$; $k_{13}$ is about 0.44; $k_{14}$: −0.5; $k_{15}$ is about 0.65, $k_{16}$ is about −0.4.

13. The process as claim 10, wherein the process is carried out in a column for removing or recovering gaseous minor components from gases or for introducing gaseous minor components into gases, the column having a first entrance and a first exit for the gas and a second entrance and a second exit for a scrubbing liquid and containing at least one packed bed of fluidizing bodies, and the gas being able to be conducted at an adjustable velocity in the column from bottom to top and the liquid being able to be conducted in countercurrent to the gas, the column height being dimensioned according to the formulae below:

$$H = k_1 \cdot SZ \cdot SH$$

$$SZ = \frac{y_e - y_a}{(y_e - y^*_e) - (y_a - y^*_a)} \cdot \ln \frac{y_e - y^*_e}{y_a - y^*_a}$$

$$**SH = k_2 \cdot d \cdot F^{k_3} \cdot S^{k_4} \, y^*_a = m \cdot x_a, y^*_e = m \cdot x_e,$$

in which the constants and variables have the following meanings:

H is the column height,

SZ is the number of theoretical plates of the column,

SH is the height equivalent to theoretical plate,

F is the Froude number.

$$F = u^2_L / (g \cdot d),$$

S is the Schmidt number, $$S = v_G / D,$$

d is the characteristic dimension of the fluidizing bodies, $u_L$ is the liquid velocity, g is acceleration due to gravity.

D is the diffusion coefficient of the gaseous minor component in the gas, $v_G$ is the kinematic viscosity of the gas, $y_e$ is the mole fraction of the gaseous minor component in the gas at the gas entrance, $y_a$ is the mole fraction of the gaseous minor component in the gas at the gas exit, $y^*_e$ is the equilibrium mole fraction of the gaseous minor component in the liquid at the gas entrance temperature, $y^*_a$ is the equilibrium mole fraction of the gaseous minor component in the liquid at the gas exit temperature, m is the phase equilibrium constant, $x_e$ is the mole fraction of the gaseous minor component in the liquid at the liquid entrance, $x_a$ is the mole fraction of the gaseous minor component in the liquid at the liquid exit, $k_1$ is a constant from the range 1.5 to 2.5, $k_2$ is a constant from the range 1.5 to 2.5, $k_3$ is a constant from the range −1 to 0, $k_4$ is a constant from the range 0 to 1.

14. The process as claimed in claim 13, wherein the constants $k_1$ to $k_4$ have values from the following ranges: $k_1$ is about 1.9 to 2.1; $k_2$ is about 1.9 to 2.0; $k_3$ is about −0.2 to −0.1; $k_4$ is about 0.5 to 0.6.

15. The process as claimed in claim 13, wherein the constants $k_1$ to $k_4$ have the following values: $k_1$ is about 2; $k_2$ is about 1.937; $k_3$ is about −0.157; $k_4$ is about 0.533.

16. A process for removing or recovering gaseous minor components from gases or for introducing gaseous minor components into gases, in which the gas is passed at an adjustable velocity from bottom to top through a column containing fluidizing bodies and a liquid is conducted in countercurrent thereto, at least one fluidized bed forming and a dynamic liquid holdup establishing itself, which comprises establishing the pressure drop over the fluidized bed according to the formula below:

$$\frac{\Delta P}{H_O} = (k_{22} - \epsilon_O) \cdot (\rho_s - \rho_G) \cdot g \cdot k_{17} \cdot \left( k_{18} - k_{19} \cdot h^{k_{20}} \right)^{k_{21}}$$

where the variables or constants are as defined above or have the meanings below:

ΔP is the pressure drop over a fluidizing bed, $H_o$ is the height of a bed of fluidizing bodies at rest, $\epsilon_o$ is the void fraction of the bed at rest, $\rho_s$ is the apparent density of a fluidizing body, h is the dynamic liquid holdup, $\rho_G$ is the gas density, g is the acceleration due to gravity, $k_{17}$ is a constant from the range 0.7 to 1.1, $k_{18}$ is a constant from the range 0.8 to 1.2.

$k_{19}$ is a constant from the range 0.1 to 0.5, $k_{20}$ is a constant from the range 0.4 to 0.8, $k_{21}$ is a constant from the range −7 to −3, $k_{22}$ is a constant from the range 0.8 to 1.2.

17. The process as claimed in claim 16, wherein the constants $k_{17}$ to $k_{22}$ have values from the following ranges: $k_{17}$ is about 0.85 to 0.95; $k_{18}$ is about 0.95 to 1.05; $k_{19}$ is about 0.32 to 0.38; $k_{20}$ is about 0.55 to 0.65; $k_{21}$ is about −5.5 to −4.5; $k_{22}$ is about 0.95 to 1.05.

18. The process as claimed in claim 16, wherein the constants $k_{17}$ to $k_{22}$ have the following values: $k_{17}$ is about 0.9; $k_{18}$ is about 1; $k_{19}$ is about 0.35; $k_{20}$ is about 0.6; $k_{21}$ is about −5, $k_{22}$ is about 1.

19. The process as claimed in claim 16, wherein the process is carried out in a column for removing or recovering gaseous minor components from gases or for introducing gaseous minor components into gases, the column having a first entrance and a first exit for the gas and a second entrance and a second exit for a scrubbing liquid and containing at least one packed bed of fluidizing bodies, and the gas being able to be conducted at an adjustable velocity in the column from bottom to top and the liquid being able to be conducted in countercurrent to the gas, the column height being dimensioned according to the formulae below:

$$H = k_1 \cdot SZ \cdot SH$$

$$SZ = \frac{y_e - y_a}{(y_e - y^*_e) - (y_a - y^*_a)} \cdot \ln \frac{y_e - y^*_e}{y_a - y^*_a}$$

$$SH = k_2 \cdot d \cdot F^{k_3} \cdot S^{k_4} \quad y^*_a = m \cdot x_a, \, y^*_e = m \cdot x_e,$$

in which the constants and variables have the following meanings:

H is the column height,
SZ is the number of theoretical plates of the column,
SH is the height equivalent to theoretical plate,
F is the Froude number, $$F = u^2_L / (g \cdot d),$$

S is the Schmidt number, $$S = v_G / D,$$

d is the characteristic dimension of the fluidizing bodies,
$u_L$ is the liquid velocity,
g is acceleration due to gravity,
D is the diffusion coefficient of the gaseous minor component in the gas,
$v_G$ is the kinematic viscosity of the gas,
$y_e$ is the mole fraction of the gaseous minor component in the gas at the gas entrance,
$y_a$ is the mole fraction of the gaseous minor component in the gas at the gas exit,
$y^*_e$ is the equilibrium mole fraction of the gaseous minor component in the liquid at the gas entrance temperature,
$y^*_a$ is the equilibrium mole fraction of the gaseous minor component in the liquid at the gas exit temperature,
m is the phase equilibrium constant,
$x_e$ is the mole fraction of the gaseous minor component in the liquid at the liquid entrance,
$x_a$ is the mole fraction of the gaseous minor component in the liquid at the liquid exit,
$k_1$ is a constant from the range 1.5 to 2.5,
$k_2$ is a constant from the range 1.5 to 2.5,
$k_3$ is a constant from the range −1 to 0,
$k_4$ is a constant from the range 0 to 1.

20. The process as claimed in claim 19, wherein the constants $k_1$ to $k_4$ have values from the following ranges: $k_1$ is about 1.9 to 2.1; $k_2$ is about 1.9 to 2.0; $k_3$ is about −0.2 to −0.1; $k_4$ is about 0.5 to 0.6.

21. The process as claimed in claim 19, wherein the constants $k_1$ to $k_4$ have the following values: $k_1$ is about 2; $k_2$ is about 1.937; $k_3$ is about −0.157, $k_4$ is about 0.533.

* * * * *